United States Patent
Namikawa

(10) Patent No.: US 11,615,930 B2
(45) Date of Patent: Mar. 28, 2023

(54) CURRENT BREAKER, SAFETY CIRCUIT AND SECONDARY BATTERY PACK

(71) Applicant: BOURNS KK, Osaka (JP)

(72) Inventor: Masashi Namikawa, Osaka (JP)

(73) Assignee: Bourns KK, Osaka (JP)

( * ) Notice: Subject to any disclaimer, the term of this patent is extended or adjusted under 35 U.S.C. 154(b) by 62 days.

(21) Appl. No.: 17/264,077

(22) PCT Filed: Jul. 29, 2019

(86) PCT No.: PCT/JP2019/029655
§ 371 (c)(1),
(2) Date: Jan. 28, 2021

(87) PCT Pub. No.: WO2020/027052
PCT Pub. Date: Feb. 6, 2020

(65) Prior Publication Data
US 2021/0375568 A1    Dec. 2, 2021

(30) Foreign Application Priority Data
Jul. 31, 2018  (JP) .............................. JP2018-144090

(51) Int. Cl.
*H01H 37/04* (2006.01)
*H01H 37/52* (2006.01)
(Continued)

(52) U.S. Cl.
CPC ............ *H01H 37/52* (2013.01); *H01H 37/04* (2013.01); *H01H 37/64* (2013.01); *H01M 50/581* (2021.01); *H01M 2200/10* (2013.01)

(58) Field of Classification Search
CPC ........ H01H 37/52; H01H 37/04; H01H 37/64; H01M 50/581; H01M 2200/10
(Continued)

(56) References Cited

U.S. PATENT DOCUMENTS

| 4,371,859 A | * | 2/1983 | Sorimachi | H01H 77/04 337/365 |
| 5,184,269 A | * | 2/1993 | Shimada | H01H 81/02 337/3 |

(Continued)

FOREIGN PATENT DOCUMENTS

| EP | 2541576 A1 | 1/2013 |
| JP | 1976005663 U | 1/1976 |

(Continued)

OTHER PUBLICATIONS

International Search Report for PCT/JP2019/029655 dated Oct. 8, 2019.

*Primary Examiner* — Anatoly Vortman
(74) *Attorney, Agent, or Firm* — Knobbe, Martens, Olson & Bear LLP

(57) ABSTRACT

A current cut-off device includes a plate-shaped terminal piece having a contact, a movable piece including an elastic portion formed in a plate shape so as to be elastically deformed and a movable contact arranged at one end portion of the elastic portion and having the movable contact so as to be pressed against and in contact with the contact, and a thermally actuated element which biases the movable piece by deforming in accordance with a temperature change and causes a state of the movable piece to be shifted from a conductive state in which the movable contact is in contact with the contact to a cut-off state in which the movable contact is separated from the contact. When the state of the movable piece is shifted from the conductive state to the cut-off state, as the movable contact moves, it gets over the contact.

10 Claims, 13 Drawing Sheets

(51) Int. Cl.
*H01H 37/64* (2006.01)
*H01M 50/581* (2021.01)

(58) Field of Classification Search
USPC .......................................................... 337/36
See application file for complete search history.

(56) References Cited

U.S. PATENT DOCUMENTS

| | | | | | |
|---|---|---|---|---|---|
| 5,235,308 | A | * | 8/1993 | Shimada | H01H 37/002 337/380 |
| 6,031,447 | A | * | 2/2000 | Hofsass | H01H 37/5427 337/365 |
| 6,633,222 | B2 | * | 10/2003 | Nagai | H01H 37/54 337/380 |
| 6,836,205 | B2 | * | 12/2004 | Scott | H01H 37/5427 337/299 |
| 7,339,454 | B1 | * | 3/2008 | Fleming | H01H 61/04 337/123 |
| 7,385,474 | B2 | * | 6/2008 | Kawanishi | H01H 37/76 337/414 |
| 8,289,124 | B2 | * | 10/2012 | Hofsaess | H01H 37/5427 337/380 |
| 9,048,048 | B2 | * | 6/2015 | Takeda | H01H 37/54 |
| 9,159,985 | B2 | * | 10/2015 | Nakanishi | H01M 50/581 |
| 9,460,876 | B2 | * | 10/2016 | Namikawa | H01H 37/52 |
| 9,472,363 | B2 | * | 10/2016 | Takeda | H01H 71/16 |
| 9,653,240 | B2 | * | 5/2017 | Namikawa | H01H 37/5427 |
| 9,691,576 | B2 | * | 6/2017 | Mitschele | H01H 37/34 |
| 9,697,974 | B2 | * | 7/2017 | Mitschele | H01H 61/04 |
| 9,715,980 | B2 | * | 7/2017 | Namikawa | H01H 37/04 |
| 9,831,054 | B2 | * | 11/2017 | Chen | H01H 37/5427 |
| 9,831,056 | B2 | * | 11/2017 | Mochizuki | H01H 83/20 |
| 11,239,037 | B2 | * | 2/2022 | Namikawa | H01H 71/02 |

FOREIGN PATENT DOCUMENTS

| | | |
|---|---|---|
| JP | S 63-285834 A | 11/1988 |
| JP | 2003-223886 A | 8/2003 |
| WO | WO 2011/105175 A1 | 9/2011 |

* cited by examiner

CURRENT BREAKER, SAFETY CIRCUIT AND SECONDARY BATTERY PACK

TECHNICAL FIELD

The present invention relates to small-sized current cut-off devices and so forth suitable for use in safety circuits of electrical equipment.

BACKGROUND ART

Conventionally, current cut-off devices are used as protection devices (safety circuits) for secondary batteries, motors, and the like of various types of electrical equipment. When an abnormality occurs such as when the temperature of a secondary battery during charging or discharging is excessively increased, for example, when an overcurrent flows through a motor or the like equipped to a device of an automobile, home appliance or the like, the current cut-off device cuts off the current to protect the secondary battery, the motor, or the like.

The current cut-off device includes a thermally actuated element which is activated according to a temperature change so as to conduct or cut off a current. Patent document 1 has disclosed a current cut-off device for which a bimetal is used as the thermally actuated element. The bimetal is an element that is formed by laminating two types of plate-shaped metal materials having different coefficients of thermal expansion, and controls the conduction state of the contact by changing its shape in accordance with a temperature change.

PRIOR ART DOCUMENT

Patent Document

Patent document 1: WO2011/105175

SUMMARY OF INVENTION

Problems to be Solved by the Invention

In recent years, with expansion of a range of application of current cut-off devices, there has been a demand for current cut-off devices which can handle large currents, that is, which have a large current capacity (for example, about 50 A). To achieve such a current cut-off device, it is required to suppress contact resistance between a movable contact and a fixed contact, for example, by increasing an elastic force generated by a movable piece and by increasing a contact pressure of the movable contact with respect to the fixed contact.

However, in the current cut-off device described in the above Patent document 1, when the elastic force generated by the movable piece is increased, the thermally actuated element is required to generate a large stress exceeding the elastic force of the movable piece when the state of the movable piece is shifted from a conductive state to a cut-off state.

In the current cut-off device disclosed in Patent document 1, the stress generated by the thermally actuated element can be increased by using a thermally actuated element having a large width measured across corners. However, the thermally actuated element configured as such is one of the factors that prevent miniaturization of the current cut-off device.

Further, in the current cut-off device described in Patent document 1, a positive temperature coefficient thermistor is implemented to maintain the cut-off state. Thus, the structure of the device is complex, therefore, a reduction in manufacturing cost is difficult.

The present invention has been made to solve the above problem, and a primary object of the present invention is to provide a current cut-off device capable of handling high current-carrying capacity with ease. Further, a primary object of the present invention is to provide a current cut-off device capable of maintaining the cut-off state of the movable piece with a small-sized, simple, and inexpensive structure without using a positive temperature coefficient thermistor or the like.

Means for Solving the Problem

In order to achieve the above objective, the present invention is a current cut-off device including a plate-shaped terminal piece having a contact, a movable piece including an elastic portion formed in a plate shape so as to be elastically deformed and a movable contact arranged at one end portion of the elastic portion and having the movable contact so as to be pressed against and in contact with the contact, and a thermally actuated element which presses the movable piece by deforming in accordance with a temperature change and causes a state of the movable piece to be shifted from a conductive state in which the movable contact is in contact with the contact to a cut-off state in which the movable contact is separated from the contact, wherein when the state of the movable piece is shifted from the conductive state to the cut-off state, as the movable contact moves, it gets over the contact.

In the current cut-off device according to the present invention, it is preferred that when the state of the movable piece is shifted from the conductive state to the cut-off state, the movable contact moves from a first surface side to a second surface side opposite to the first surface of the terminal piece.

In the current cut-off device according to the present invention, it is preferred that a direction in which the movable piece presses the movable contact to the contact and a direction in which the thermally actuated element biases the movable piece match.

In the current cut-off device according to the present invention, it is preferred that the thermally actuated element biases the movable piece in a direction of pushing when the state of the movable piece is shifted from the conductive state to the cut-off state.

In the current cut-off device according to the present invention, it is preferred that the device comprises a case for accommodating the contact, the elastic portion, the movable contact, and the thermally actuated element, and the terminal piece and the movable piece are embedded in the case.

In the current cut-off device according to the present invention, it is preferred that the case includes a first case provide with a hole portion for accommodating the contact, the elastic portion, the movable contact, and the thermally actuated element, and a second case to be attached to the first case so as to close the hole portion.

In the current cut-off device according to the present invention, it is preferred that the device has a movable body movably provided with respect to the case, and the movable body is pressed onto the movable piece in the cut-off state so as to get the state of the movable piece back to the conductive state.

In the current cut-off device according to the present invention, it is preferred that the device has a movable body movably provided with respect to the case, the movable body is pressed onto the movable piece in the cut-off state so as to get the state of the movable piece back to the conductive state, the second case has formed therein a through hole for allowing part of the movable body to stick out of the case, and the movable body is provided so as to freely protrude and retract from the through hole.

In the current cut-off device according to the present invention, it is preferred that a slit extending in a longitudinal direction of the movable piece is formed in at least one of the contact and the movable contact.

A safety circuit according to the present invention is characterized in that it is provided with the above-described current cut-off device.

A secondary battery pack according to the present invention is characterized in that it is provided with the above-described current cut-off device.

Advantageous Effects of the Invention

According to the current cut-off device of the present invention, when the state of the movable piece is shifted from the conductive state to the cut-off state, as the movable contact moves, it gets over the contact. The motive power for the movable contact to get over the contact is a resultant force of the elastic force of the elastic portion and a stress generated by the thermally actuated element. Therefore, even if the stress generated by the thermally actuated element when deformed as being inversely warped is small, the state of the movable piece can be shifted from the conductive state to the cut-off state. Thereby, the contact pressure of the movable contact with respect to the contact of the terminal piece can be increased without increasing the width measured across corners of the thermally actuated element, thus, the contact resistance between the contact and the movable contact is suppressed, therefore, large current-carrying capacity of the current cut-off device can be easily achieved.

Further, the movable piece in the cut-off state, in which the movable contact has gotten over the contact of the terminal piece as the movable contact has moved, maintains the cut-off state by the elastic force of the elastic portion even after the thermally actuated element has returned to its original shape. Therefore, the cut-off state of the movable piece can be maintained by a simple and inexpensive configuration without using a positive temperature coefficient thermistor and the like.

BRIEF DESCRIPTION OF DRAWINGS

FIG. 3 is a cross-sectional view showing the current cut-off device of FIG. 1 in an overcharge state or an abnormality and the like.

FIG. 6 is a cross-sectional view showing the current cut-off device of FIG. 4 in an overcharge state or an abnormality and the like.

DETAILED DESCRIPTION

Figure 1:
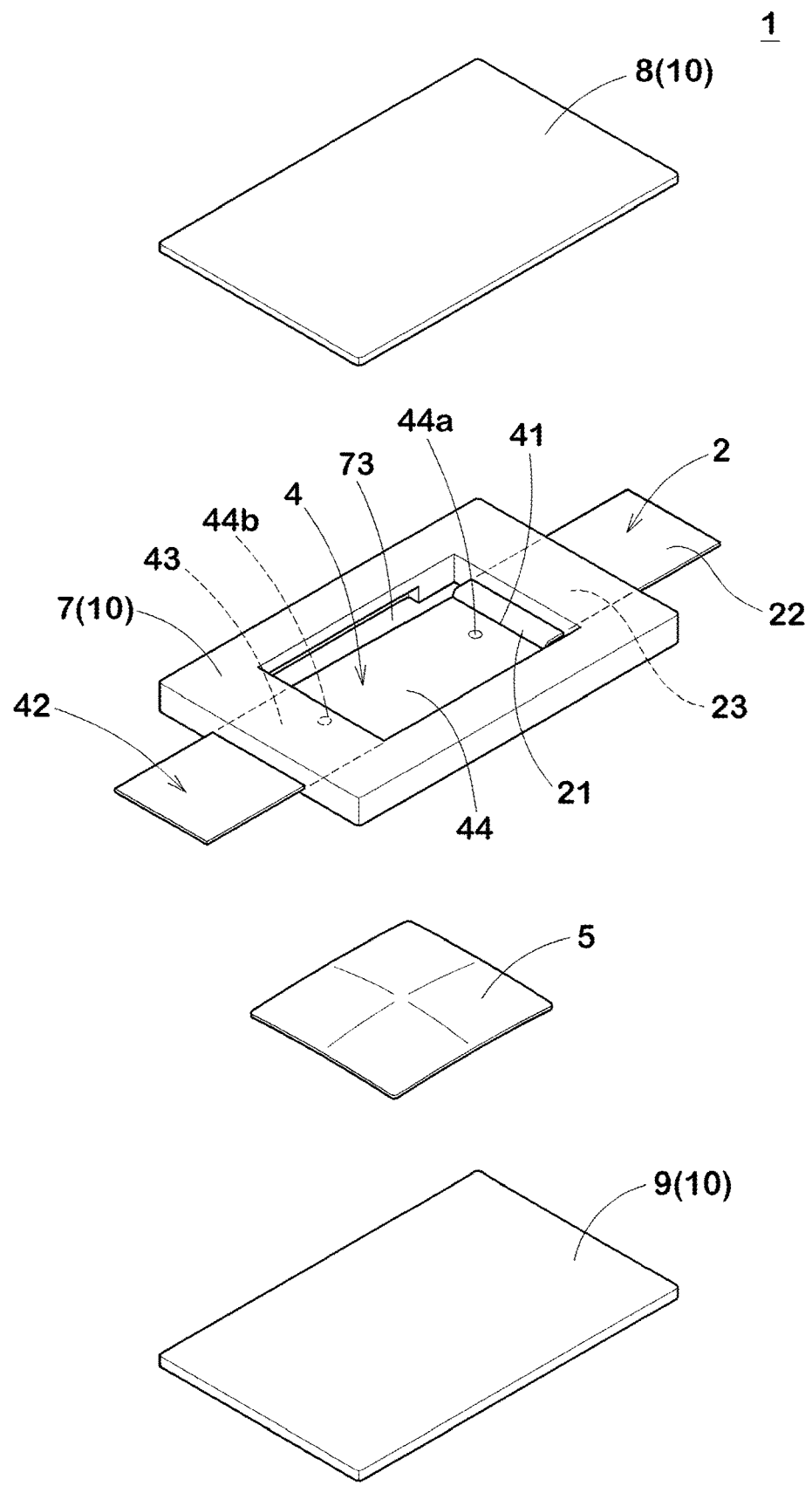
FIG. 1 is a perspective view showing a schematic configuration of a current cut-off device, before assembly, according to one embodiment of the present invention.
Figure 2:
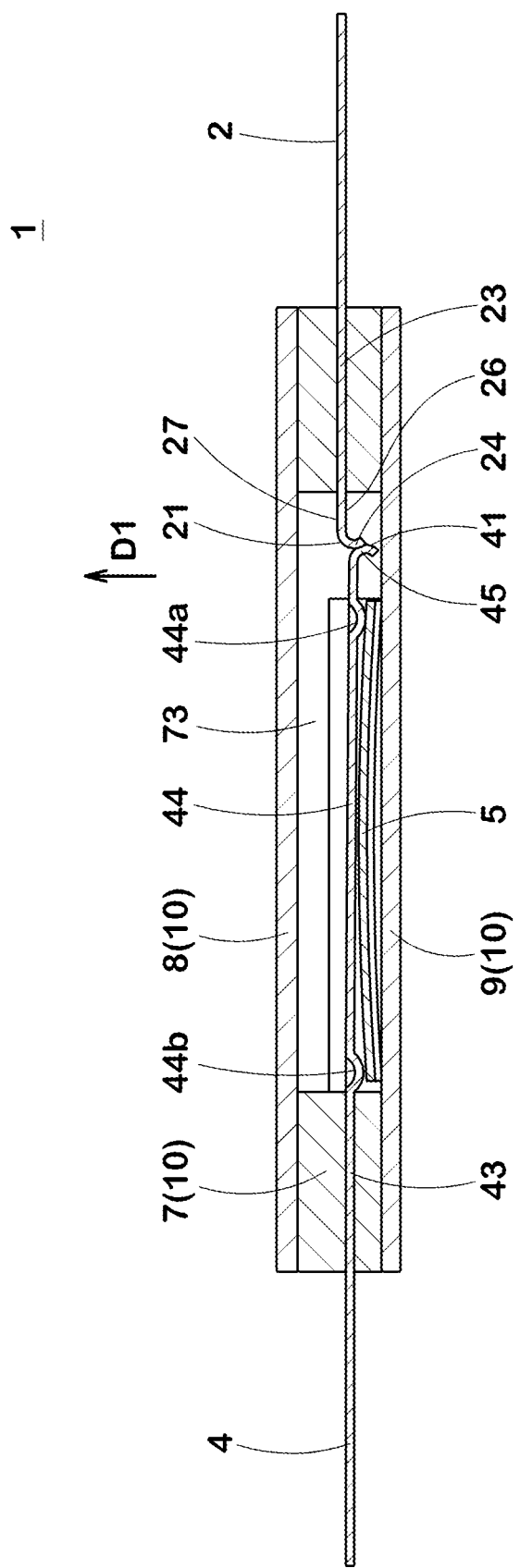
FIG. 2 is a cross-sectional view showing the current cut-off device of FIG. 1 in a normal charge or discharge state.
Figure 3:
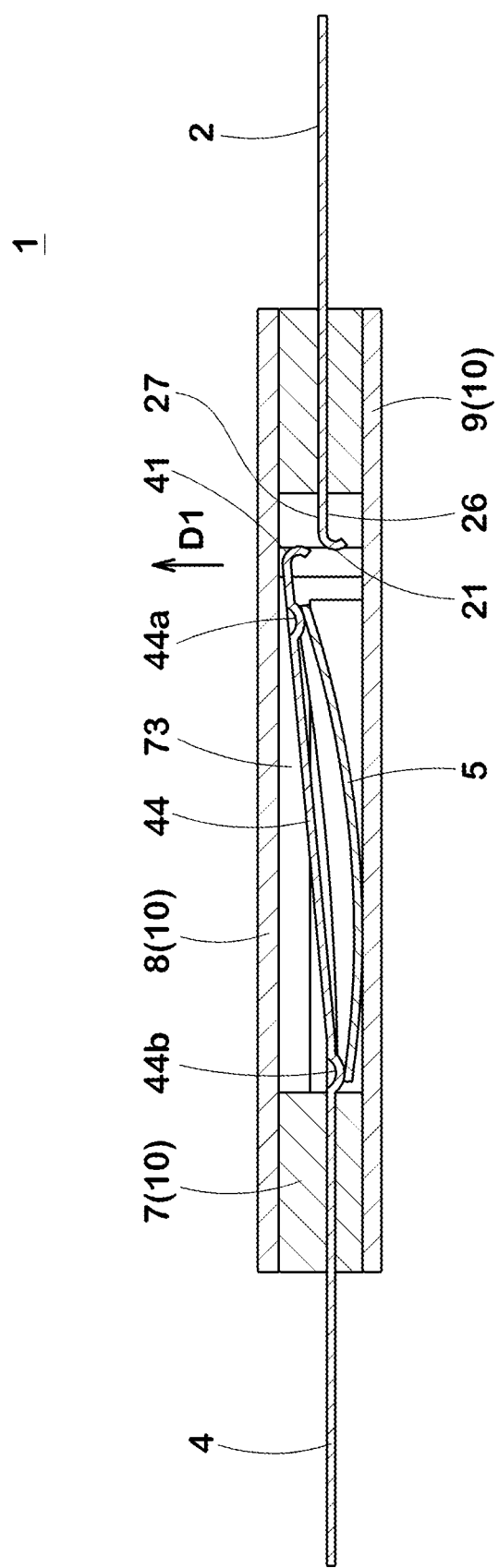

The current cut-off device according to one embodiment of the present invention now be described below in conjunction with accompanying drawings. FIG. 1 to FIG. 3 show the configuration of a current cut-off device 1. As shown in FIG. 1 and FIG. 3, the current cut-off device 1 includes a pair of terminals 22 and 42 partially exposed from a case 10 to the outside. With the terminals 22 and 42 electrically connected to external circuits (not shown), the current cut-off device 1 constitutes a main portion of a safety circuit of electrical equipment.

As shown in FIG. 1, the current cut-off device 1 is configured to include a terminal piece 2 having a contact 21 and the terminal 22, a movable piece 4 having a movable contact 41 arranged at a tip portion thereof, a thermally actuated element 5 which deforms in accordance with a temperature change, and so forth.

The terminal piece 2, the movable piece 4, and the thermally actuated element 5 are accommodated in the case 10. The case 10 consists of a case main body (first case) 7, a lid member (second case) 8 to be attached to the upper surface of the case main body 7, a bottom member (third case) 9 to be attached to the lower surface of the case main body 7, and so forth.

The terminal piece 2 is formed into a plate shape by press working of, for example, a metal plate having copper or the like as a main component (alternatively, a metal plate made of a copper-titanium alloy, nickel silver, brass, or the like), and is embedded in the case main body 7 by insert molding.

The contact 21 is formed by plating, coating, or the like of a highly conductive material such as silver, nickel, or a nickel-silver alloy, as well as a copper-silver alloy, a gold-silver alloy, or the like. The contact 21 is formed at a position opposed to the tip portion of the terminal piece 2, that is, the movable contact 41, and is exposed in a hole portion 73 that is an inner space formed inside the case main body 7.

In the present embodiment, the tip portion of the terminal piece 2 is bent to have a "J"-shaped cross section, and the contact 21 is formed on the outer surface of this bent area 24.

At the other end portion of the terminal piece 2, the terminal 22, which is to be electrically connected to an external circuit, is formed. The terminal 22 is exposed from a side wall of the case main body 7, and is connected to a land portion of a circuit board by a technique such as soldering.

The terminal piece 2 has an embedded portion 23 between the contact 21 and the terminal 22. The terminal piece 2 is embedded in the case main body 7 at the embedded portion 23.

The movable piece 4 is formed in a plate shape by press working of a metal material having copper or the like as a main component. The movable piece 4 is formed in an arm: shape symmetry with respect to a center line extending in a longitudinal direction thereof.

The movable contact 41 is formed at a tip portion of the movable piece 4. The movable contact 41 is formed of a material equivalent to that of the contact 21 by utilizing a technique such as plating, coating, or the like.

In the present embodiment, the tip portion of the movable piece 4 is bent to have a "J"-shaped cross section, and the movable contact 41 is formed on the outer surface of this bent area 45.

At the other end portion of the movable piece 4, the terminal 42, which is to be electrically connected to an external circuit, is formed. The terminal 42 is exposed from a side wall of the case main body 7, and is connected to a land portion of a circuit board by a technique such as soldering.

The movable piece 4 has an embedded portion 43 and an elastic portion 44 between the movable contact 41 and the terminal 42. The embedded portion 43 is formed between the terminal 42 and the elastic portion 44. The movable piece 4 is embedded in the case main body 7 at the embedded portion 43.

The elastic portion 44 is extended from the embedded portion 43 to the movable contact 41 side. The movable contact 41 is formed at a tip portion of the elastic portion 44. The elastic portion 44 and the movable contact 41 are exposed to the hole portion 73 that is the inner space.

By the embedded portion 43 being embedded in the case main body 7, the movable piece 4 is fixed. By the elastic portion 44 being elastically deformed, the movable contact 41 formed at its tip is pressed toward the contact 21 to be in contact with the contact 21, thereby allowing the terminal piece 2 and the movable piece 4 to be energized.

The movable piece 4 is curved or bent at the elastic portion 44 by press working. The degree of curving or bending is not particularly limited as long as the thermally actuated element 5 can be accommodated, and can be set appropriately in consideration of the operating temperature, the pressurizing force of the movable contact 41, and so forth. In the present embodiment, the movable piece 4 is bent at the elastic portion 44 so that, in a natural state, one end portion of the movable piece 4 where the movable contact 41 is formed is positioned closer to the lid member 8 than the other end portion where the terminal 42 is formed (see FIG. 3). Further, on the elastic portion 44, a pair of protrusions (contact portions) (44a) and (44b) protruding toward the thermally actuated element 5 are formed. The protrusions (44a) and (44b) and the thermally actuated element 5 are to come into contact with each other, and deformation of the thermally actuated element 5 is transmitted via the protrusions (44a) and (44b) to the elastic portion 44 (see FIG. 1 and FIG. 3).

The thermally actuated element 5 causes the state of the movable piece 4 to be shifted from a conductive state in which the movable contact 41 is in contact with the contact 21 to a cut-off state in which the movable contact 41 is separated from the contact 21. The thermally actuated element 5 has an initial shape curved in an arc shape, which is formed by laminating thin-plate materials having different coefficients of thermal expansion. When the temperature reaches an operating temperature by overheating, the curved shape of the thermally actuated element 5 becomes inversely warped with a snap motion and returns when the temperature becomes below a reset temperature by cooling. The initial shape of the thermally actuated element 5 can be formed by press working. The material and shape of the thermally actuated element 5 are not particularly limited as long as it is deformed as being inversely warped at a predetermined temperature. However, in view of the productivity and efficiency of the inverse warping motion, a rectangular shape is preferred, and a small-sized rectangle shape close to a square shape is preferred for efficiently pushing up the elastic portion 44 while being small. It should be noted that as the material of the thermally actuated element 5, a laminate of two types of materials having different coefficients of thermal expansion made of various alloys such as nickel silver, brass, and stainless steel, for example, copper-nickel-manganese alloy or nickel-chromium-iron alloy on the high expansion side, and iron-nickel alloy on the low expansion side, is used in combination according to the required conditions.

In the present application, in the movable piece 4, a surface on a side where the elastic portion 44 is opposed to the thermally actuated element 5 (that is, a lower surface in FIG. 1 to FIG. 3) is described as a first surface, and a surface on its opposite side is described as a second surface, unless otherwise specified. The same goes for the other components arranged along the movable piece 4, for example, the terminal piece 2, the thermally actuated element 5, the case 10, and so forth.

The case main body 7, the lid member 8, and the bottom member 9 constituting the case 10 are molded of a thermoplastic resin such as flame-retardant polyamide, polyphenylene sulfide (PPS), liquid-crystal polymer (LCP), and polybutylene terephthalate (PBT) having high heat resistance, and the like. An insulating material other than the resin may be used as long as characteristics equal to or higher than those of the above-described resin can be obtained.

In the case main body 7, the hole portion 73 is formed, which is an inner space for accommodating the contact 21, the movable contact 41, the elastic portion 44, the thermally actuated element 5, and so forth. The hole portion 73 penetrates the case main body 7 in a thickness direction thereof. The hole portion 73 is formed in a substantially rectangular shape in a planar view. With the hole portion 73 formed in the case main body 7, the elastic portion 44 can be elastically deformed, and the thermally actuated element 5 can be deformed as being inversely warped.

As shown in FIG. 1, the lid member 8 and the bottom member 9 are attached to the case main body 7 to close the hole portion 73 of the case main body 7 accommodating the terminal piece 2, the movable piece 4, the thermally actuated element 5, and so forth. That is, the case main body 7 is sandwiched by the lid member 8 and the bottom member 9 in a thickness direction of the case main body 7 and then the case main body 7 and the lid member 8, and the case main body 7 and the bottom member 9 are joined together by ultrasonic welding, for example. At this time, the case main body 7 and the lid member 8 are continuously joined together all around their outer edge portions, thereby, hermeticity of the case 10 is improved. Similarly, the case main body 7 and the bottom member 9 are continuously joined together all around their outer edge portions, therefore, hermeticity of the case 10 is improved.

In the lid member 8 or the bottom member 9, a cover piece may be embedded by insert molding. The cover piece is formed in a plate shape by press working of a metal such as the above-described metal having copper or the like as a main component or stainless steel, for example. The cover piece contributes to miniaturization of the current cut-off device 1 while increasing rigidity and strength of the lid member 8 or the bottom member 9 and eventually of the case 10 as a housing.

FIG. 2 shows the operation of the current cut-off device 1 in a normal charge or discharge state, that is, in which the movable piece 4 is in the conductive state. In the conductive state, the thermally actuated element 5 maintains the initial shape (before being inversely warped).

In the conductive state shown in FIG. 2, the movable contact 41 is positioned on a first surface 26 side of the terminal piece 2. Note that "the first surface 26 of the terminal piece 2" means a surface of the terminal piece 2 opposed to the bottom member 9 in FIG. 2 (as in the present embodiment, in the mode in which the tip portion of the terminal piece 2 has the area 24 bent in a "J" shape, that area 24 is excluded. In the following, the same goes for a second surface 27 described further below). In this conductive state, the movable contact 41 is biased to the contact 21 side by the elastic force of the elastic portion 44. This causes the movable contact 41 and the contact 21 to be in contact with each other, allowing the movable contact 41 and the contact 21 to be energized. Further, by increasing the elastic force of the elastic portion 44, the contact pressure between the movable contact 41 and the contact 21 is increased, therefore, resistance between them is suppressed.

FIG. 3 shows the operation of the current cut-off device 1 in an overcharge state or at the time of an abnormality, that is, the state in which the movable piece 4 is in the cut-off state. When the device enters into a high-temperature state due to overcharge or an abnormality, the thermally actuated element 5, as the temperature reaches the operating temperature, is warped inversely. The elastic portion 44 of the movable piece 4 is then pushed up as shown in the drawing. With this, the movable contact 41 on the first surface 26 side in the conductive state shown in FIG. 2 gets over the contact 21 and moves to the second surface 27 side of the terminal piece 2. The "second surface 27 of the terminal piece 2" means a surface of the terminal piece 2 opposite to the first surface 26, that is, a surface of the terminal piece 2 opposed to the lid member 8. Furthermore, in addition to the elastic force of the elastic portion 44, by the thermally actuated element 5 pressing the elastic portion 44, the movable contact 41 is separated from the contact 21, therefore, the movable piece 4 is shifted to the cut-off state shown in FIG. 3.

As shown in FIG. 2 and FIG. 3, in the present current cut-off device 1, when the state of the movable piece 4 is shifted from the conductive state to the cut-off state, the movable contact 41 gets over the contact 21 and moves from the first surface 26 side to the second surface 27 side of the terminal piece 2. That is, the movable contact 41 moves from the bottom member 9 side to the lid member 8 side with respect to the terminal piece 2.

The motive power for the movable contact 41 to get over the contact 21 is a resultant force of the elastic force of the elastic portion 44 and a stress generated by the thermally actuated element 5. Therefore, even if the stress generated by the thermally actuated element 5 when deformed as being inversely warped is small, the state of the movable piece 4 can be shifted from the conductive state to the cut-off state. Thereby, the contact pressure of the movable contact 41 with respect to the contact 21 of the terminal piece 2 can be increased without increasing the width across corner of the thermally actuated element 5, thus, the contact resistance between the contact 21 and the movable contact 41 is suppressed, therefore, large current-carrying capacity of the current cut-off device 1 can be easily achieved.

Further, the movable piece 4 in the cut-off state, in which the movable contact 41 has gotten over the contact 21 of the terminal piece 2 and has moved to the second surface 27 side, remains on the second surface 27 side and maintains the cut-off state by the elastic force of the elastic portion 44 even after the thermally actuated element 5 has returned to the original shape. Therefore, the cut-off state of the movable piece 4 can be maintained with a simple and inexpensive configuration without using the positive temperature coefficient thermistor described in Patent document 1 or the like, thereby, a self-holding function of the current cut-off device 1 can be achieved.

In the present embodiment, the direction in which the movable piece 4 in the conductive state presses the movable contact 41 to the contact 21 and the direction in which the thermally actuated element 5 biases the movable piece 4 when the state is shifted from the conductive state to the cut-off state are the same direction, both being an arrow D1 direction (a direction from the first surface 26 of the terminal piece 2 toward the second surface 27 of the terminal piece 2). Therefore, the state of the movable piece 4 can be shifted from the conductive state to the cut-off state without using the thermally actuated element 5 which generates a large stress at the time of inversely-warping deformation, thereby miniaturization of the thermally actuated element 5 and, in turn, miniaturization of the current cut-off device 1 can be achieved.

The thermally actuated element 5 biases the movable piece 4 in a direction of pushing the movable piece 4 when the state of the movable piece 4 is shifted from the conductive state to the cut-off state.

The terminal piece 2 of the present embodiment is embedded at the embedded portion 23, and the movable piece 4 is embedded at the embedded portion 43 each in the case main body 7. This facilitates assembly of the current cut-off device 1. More specifically, for example, the operation of assembling the movable piece and the case main body, as in the current cut-off device shown in Patent document 1, is omitted, thereby, productivity can be improved. Further, the accuracy of positioning of the movable piece 4 with respect to the case main body 7 can be improved.

In addition, by the hole portion 73 provided in the case main body 7, a space where the movable piece 4 and the thermally actuated element 5 can be deformed is easily realized, and furthermore, reliable contact and separation between the contact 21 and the movable contact 41 are easily realized. Moreover, since the hole portion 73 penetrates through the case main body 7, the thermally actuated element 5 is easily incorporated therein.

Figure 4:
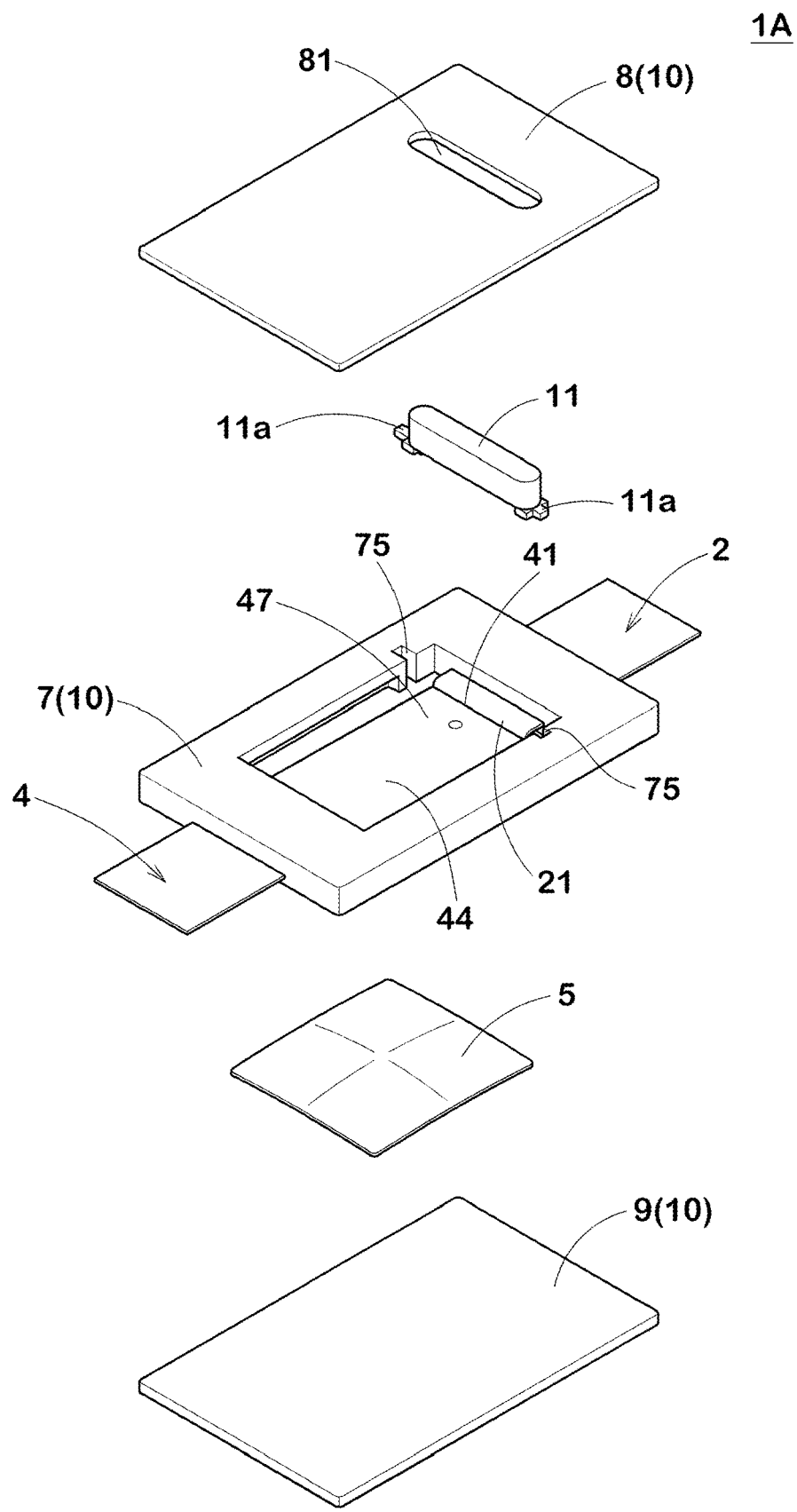
FIG. 4 is a perspective view showing a schematic configuration of a modification of the current cut-off device of FIG. 1 before assembly.
Figure 5:
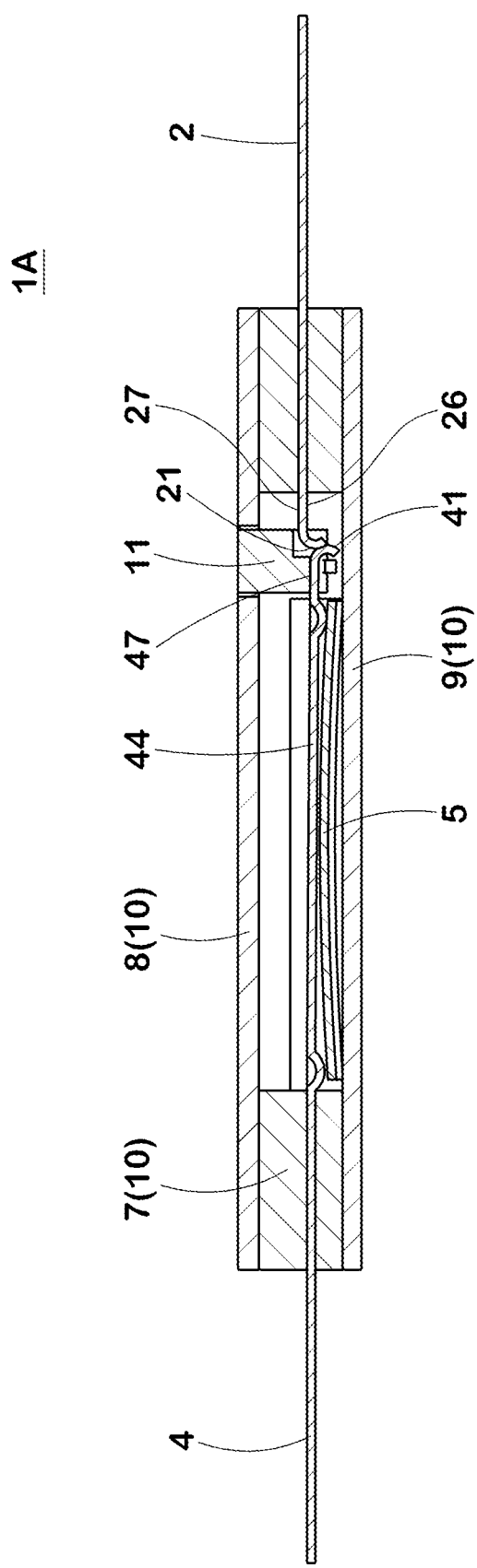
FIG. 5 is a cross-sectional view showing the current cut-off device of FIG. 4 in a normal charge or discharge state.
Figure 6:
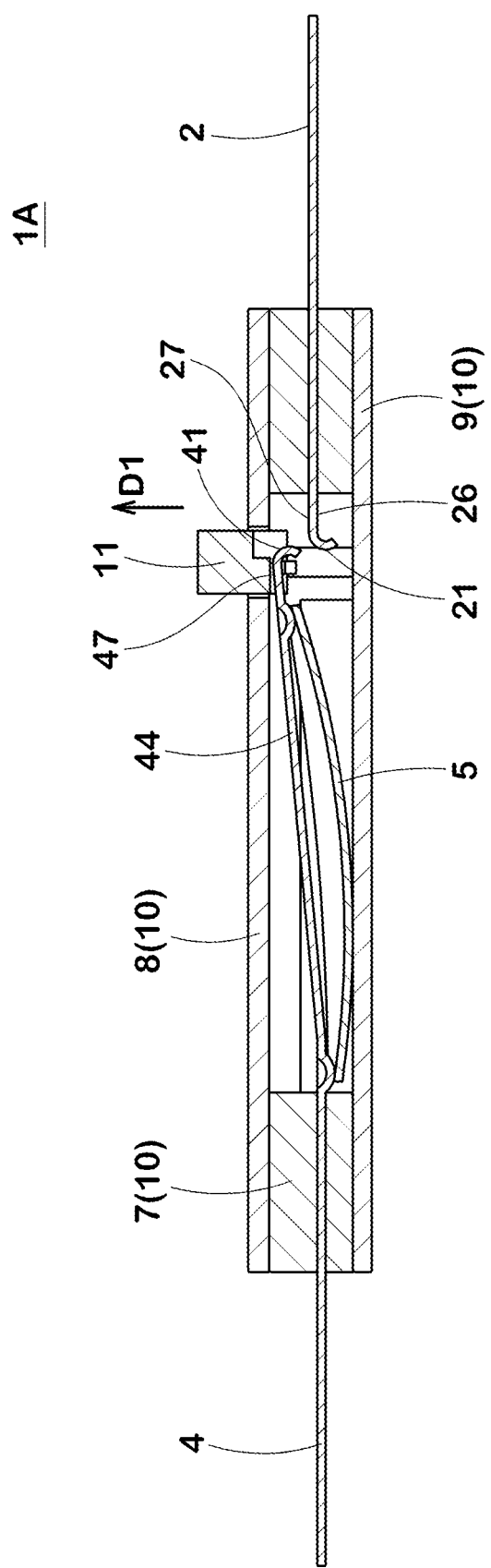

FIG. 4 to FIG. 6 show the configuration of a current cut-off device 1A, which is a modification of the current cut-off device 1 shown in FIG. 1 to FIG. 3. For portions of the current cut-off device 1A not described below, the configuration of the above-described current cut-off device 1 can be adopted.

The current cut-off device 1A is different from the above-described current cut-off device 1 in having a movable body 11 which gets the movable piece 4 back from the cut-off state to the conductive state.

The movable body 11 is provided so as to be movable with respect to the case 10 in the thickness direction of the case 10. The movable body 11 is in contact with a second surface 47 of the movable piece 4 in the vicinity of the movable contact 41.

In the present embodiment, a through hole 81 is formed in the lid member 8. The through hole 81 is provided at a position corresponding to the movable body, which allows part of the movable body 11 to freely protrude and retract with respect to the case 10.

The operation of the thermally actuated element 5 and the movable piece 4 in the conductive state shown in FIG. 5 and the cut-off state shown in FIG. 6 is similar to that of the current cut-off device 1 shown in FIG. 2 and FIG. 3. In the current cut-off device 1A in the cut-off state, the movable contact 41 gets over the contact 21 of the terminal piece 2 and moves from the first surface 26 side to the second surface 27 side of the terminal piece 2, and the movable body 11 moves integrally with the movable piece 4 in the arrow D1 direction, therefore, an upper portion of the movable body 11 sticks out of the through hole 81.

Figure 7:
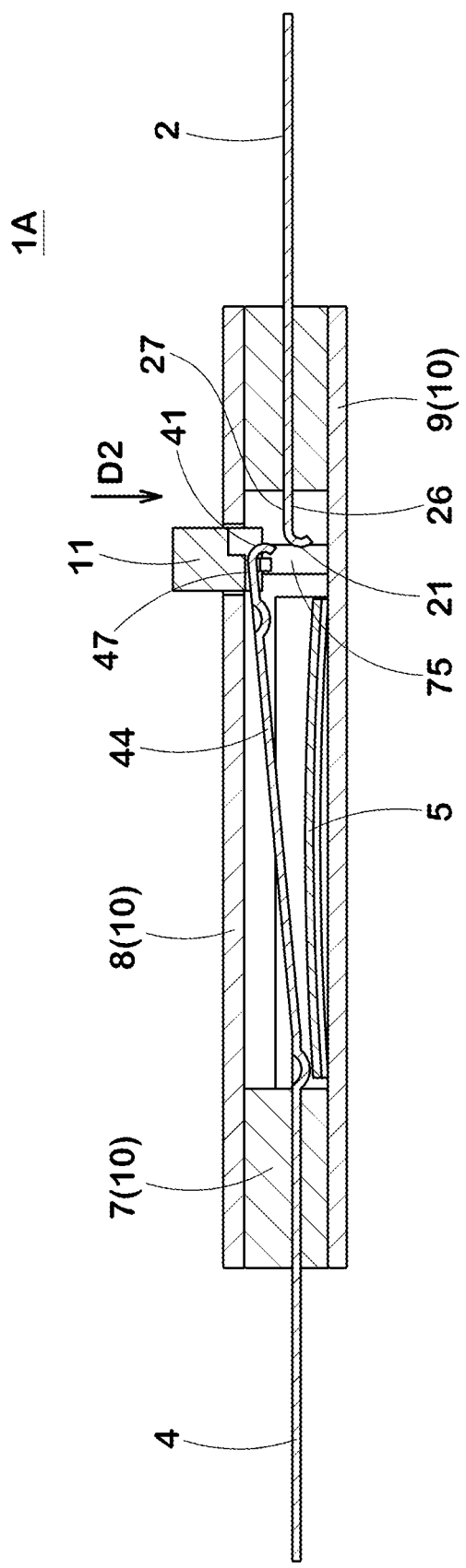
FIG. 7 is a cross-sectional view showing the current cut-off device when a thermally actuated element returns from the state shown in FIG. 6 to its original shape.

FIG. 7 shows the current cut-off device 1A in which the state of the movable piece 4 is shifted to the cut-off state and the thermally actuated element 5 has returned to its original shape. As already described in the current cut-off device 1, the movable piece 4 that has come to be in the cut-off state still maintains the cut-off state by the elastic force of the elastic portion 44 even after the thermally actuated element 5 has returned to the original shape, and the movable contact 41 remains on the second surface 27 side of the terminal piece 2. As a result, the movable body 11 is maintained to be sticking out from the through hole 81.

The movable body 11 functions as a return button which causes the movable piece 4 shifted to be in the cut-off state to return to the conductive state. That is, by pushing down the movable body 11 by a force larger than the elastic force generated by the elastic portion 44 in the arrow D2 direction from the lid member 8 toward the bottom member 9, the movable body 11 and the movable contact 41 move in the arrow D2 direction, and the movable contact 41 gets over the contact 21 and moves to the first surface 26 side of the terminal piece 2. As a result, the movable piece 4 returns to the conductive state.

The present current cut-off device 1A is suitably used in an embodiment in which a reflow soldering process is applied, for example. In such an embodiment, the thermally actuated element 5 is deformed as being inversely warped by heat during the reflow soldering process, and the state of the movable piece 4 is shifted from the conductive state to the cut-off state. After the reflow soldering process is finished, the movable piece 4 maintains the cut-off state even after the temperature of the thermally actuated element 5 is decreased. However, by pushing down the movable body 11 in the arrow D2 direction, the movable piece 4 can be easily returned to the conductive state.

As shown in FIG. 4, it is preferred that grooves 75 for guiding the movable body 11 are formed in the case main body 7. The grooves 75 are formed at both end portions of the movable body 11 so as to extend in the thickness direction of the case main body (the arrow D2 direction shown in FIG. 7). At each of both end portions of the movable body 11, a protruding portion (11a), which is to be accommodated in a respective of the grooves 75, is formed. By the engagement between the grooves 75 and the protruding portions (11a), the movable body 11 is appropriately guided, which enables smooth movement.

Figure 8:
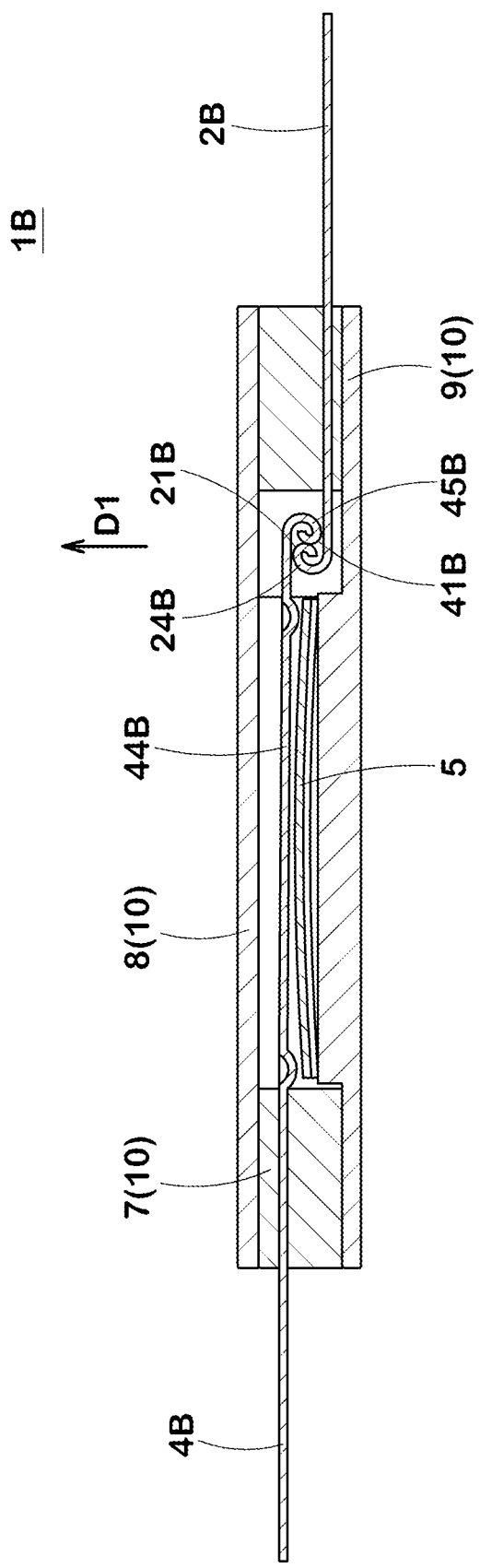
FIG. 8 is a cross-sectional view showing another modification of the current cut-off device of FIG. 1.

FIG. 8 shows the configuration of a current cut-off device 1B, which is a modification of the current cut-off device 1 and so forth shown in FIG. 1. For portions of the current cut-off device 1B not described below, the configurations of the above-described current cut-off device 1 or 1A can be adopted.

In the current cut-off device 1B, the forms of a contact 21B and a movable contact 41B are different from those of the contact 21 and the movable contact 41 of the above-described current cut-off device 1 and so forth. In a tip portion of a terminal piece 2B of the current cut-off device 1B, an area 24B bent in a "J" shape is expanded. That is, the area 24B is extended so as to substantially go around once, and has the contact 21B formed at its extended portion. Similarly, in a tip portion of a movable piece 4B of the current cut-off device 1B, an area 45B bent in a "J" shape is expanded. That is, the area 45B is extended so as to substantially go around once, and has the movable contact 41B formed at its extended portion.

In the current cut-off device 1B, an elastic portion 44B of the movable piece 4B presses the movable contact 41B in a direction so as to press the movable contact 41B onto the contact 21B, that is, the arrow D1 direction from the bottom member 9 to the lid member 8. Thereby, the movable contact 41B and the contact 21B are in contact with each other, therefore, conduction between the movable contact 41B and the contact 21B is maintained. Then, when the state of the movable piece 4B is shifted from the conductive state to the cut-off state, the movable contact 41B gets over the contact 21B as it moves. At this time, the thermally actuated element 5 biases the movable piece 4B in a direction of pushing, that is, the arrow D1 direction. Therefore, the direction in which the movable piece 4B pressurizes the movable contact 41 to the contact 21 and the direction in which the thermally actuated element 5 biases the movable piece 4B match.

In the current cut-off device 1B, the thermally actuated element 5 may be disposed between the movable piece 4B and the lid member 8. In this case, for example, the thermally actuated element 5 has its both end portions engaged with the elastic portion 44B, and biases the movable piece 4B in a direction of pulling, that is, the arrow D1 direction, when the state of the movable piece 4B is shifted from the conductive state to the cut-off state.

Figure 9:
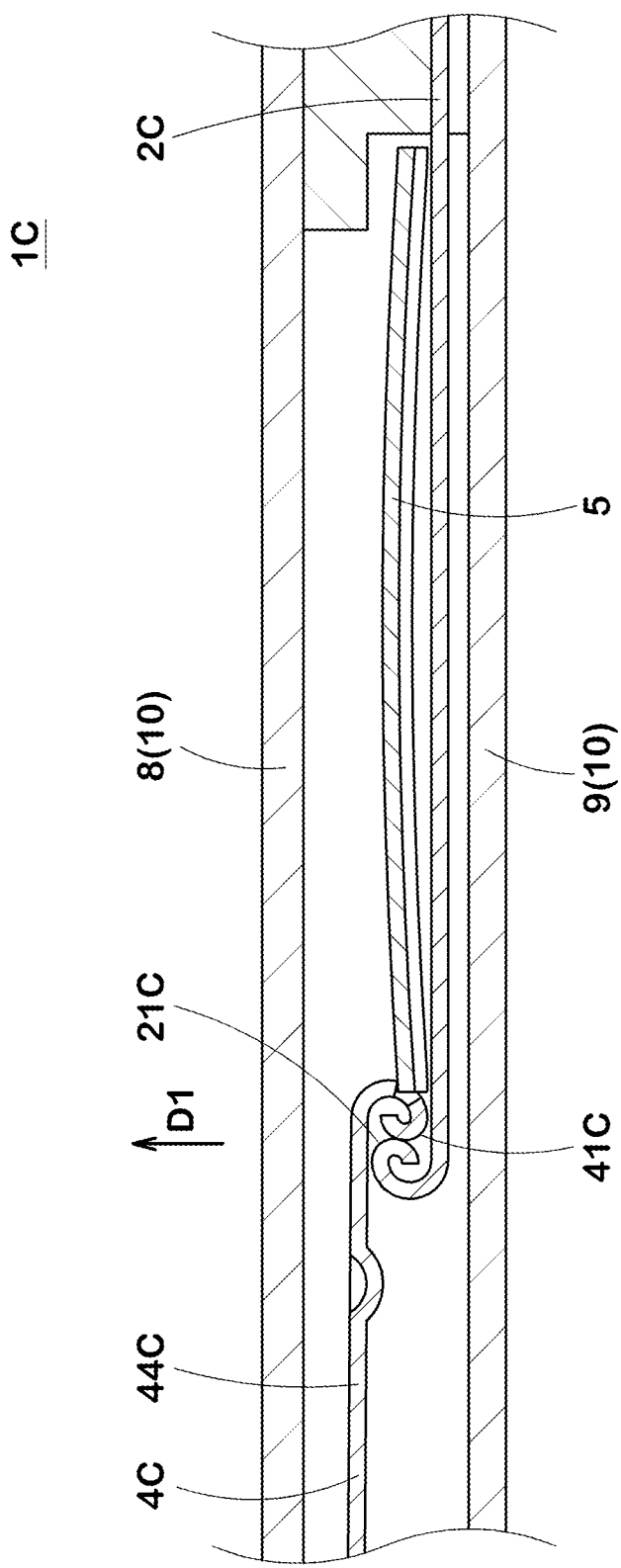
FIG. 9 is a cross-sectional view showing a modification of the current cut-off device of FIG. 8.

FIG. 9 shows the configuration of a current cut-off device 1C, which is a modification of the current cut-off device 1B shown in FIG. 8. For portions of the current cut-off device 1C not described below, the configurations of the above-described current cut-off device 1B can be adopted.

The current cut-off device 1C is different from the above-described current cut-off device 1B in that the thermally actuated element 5 is arranged on the terminal piece 2 side. And one end portion of the thermally actuated element 5 is configured to be able to be engaged with an elastic portion 44C (for example, in the vicinity of the movable contact 41C) of a movable piece 4C, and the other end portion is configured to be able to be engaged with the case 10 (for example, the case main body 7 or the like).

Figure 10:
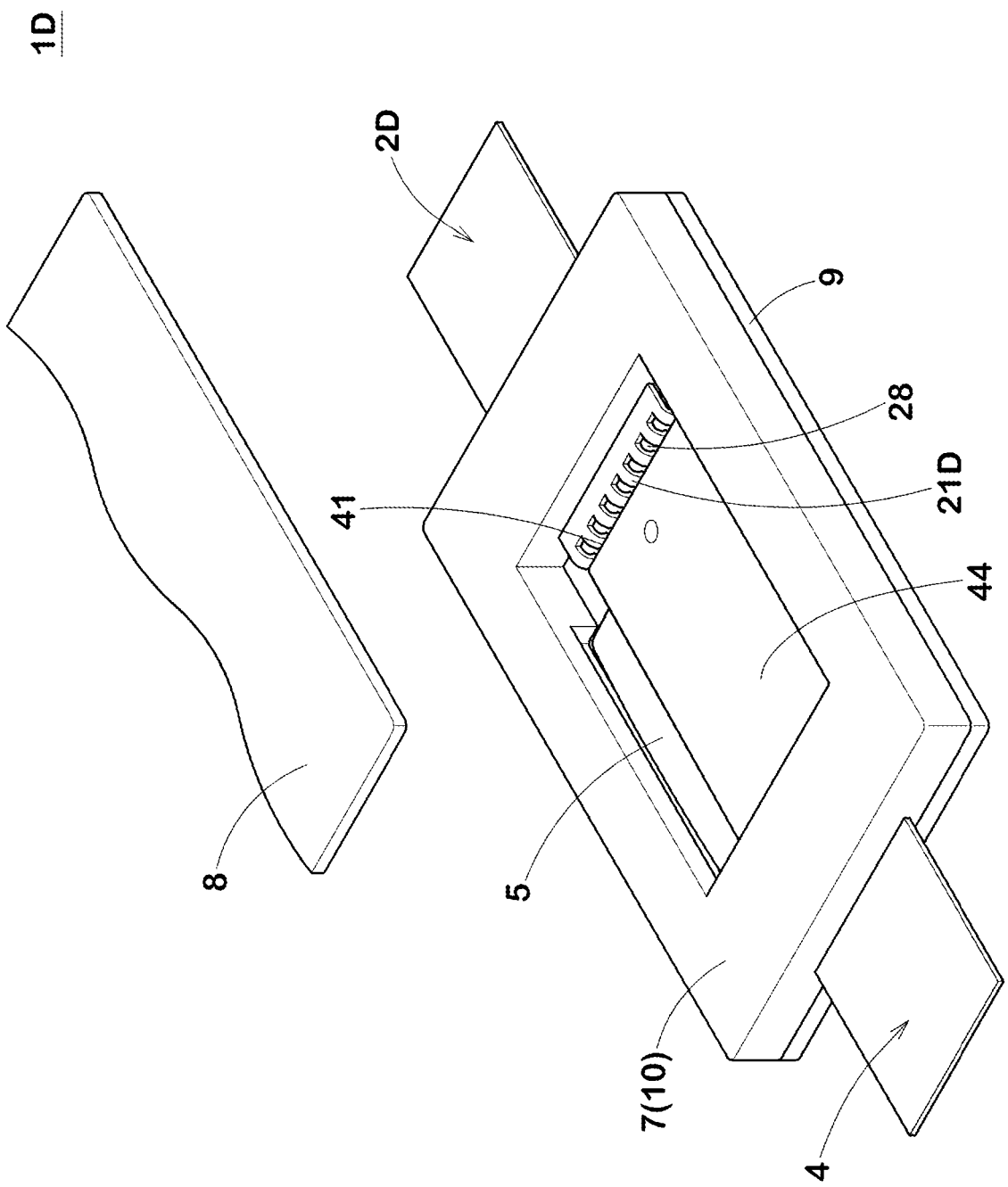
FIG. 10 is a perspective view showing the configuration of a terminal piece of yet another modification of the current cut-off device of FIG. 1.

FIG. 10 shows the configuration of a current cut-off device 1D, which is a modification of the current cut-off device 1 shown in FIG. 1 and so forth. For portions of the current cut-off device 1D not described below, the configurations of the above-described current cut-off devices 1 to 1C and so forth can be adopted.

The current cut-off device 1D is different from the above-described current cut-off device 1 and so forth in that slits 28 are formed in a contact 21D. The slits 28 are formed so as to extend in a longitudinal direction of the movable piece 4.

By forming the slits 28 in the contact 21D, the rigidity of the contact 21D is decreased, therefore, the movement of the movable contact 41, that is, getting over the contact 21D, is made easier. As a result, the state of the movable piece 4 can be shifted from the conductive state to the cut-off state without using the thermally actuated element 5 which generates a large stress at the time of inversely-warping deformation. The shape, size, and number of the slits 28 can be arbitrary, and are set as appropriate in accordance with the specifications of the movable piece 4 and the thermally actuated element 5.

It should be noted that in the current cut-off device 1D, in addition to or in place of the slits 28 of the contact 21D, slits (not shown) may be provided in the movable contact 41 of the movable piece 4.

Figure 11:
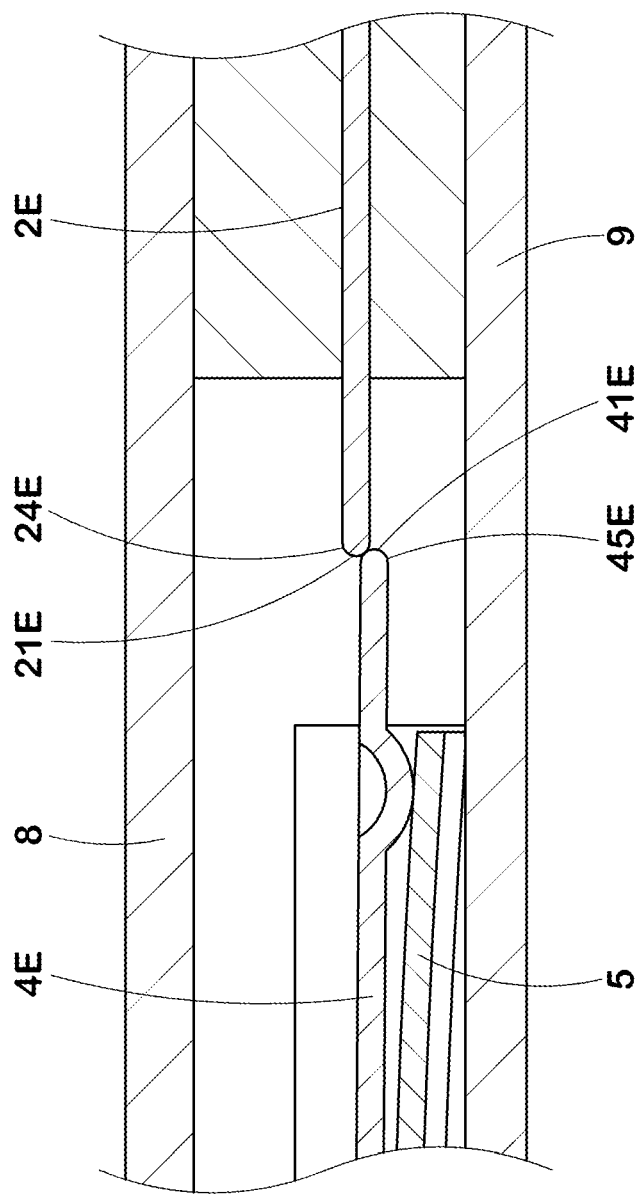
FIG. 11 is a cross-sectional view showing the configuration of a terminal piece and a movable piece of the modification of the current cut-off device shown in FIG. 1.

FIG. 11 shows the configuration of a terminal piece 2E and a movable piece 4E of a current cut-off device 1E, which are modifications of those of the current cut-off device 1 shown in FIG. 1 and so forth. For portions of the current cut-off device 1E not described below, the configurations of the above-described current cut-off devices 1 to 1D and so forth can be adopted.

The current cut-off device 1E is different from the above-described current cut-off device 1 and so forth in that a tip portion of a terminal piece 2E is provided with a chamfered portion 24E and a tip portion of a movable piece 4E is provided with a chamfered portion 45E.

A contact 21E is formed in an area including the chamfered portion 24E, and a movable contact 41E is formed in an area including the chamfered portion 45E.

By the chamfered portions 24E and 45E, the movement of the movable contact 41E, that is, getting over the contact 21E is made easier. Thereby, the state of the movable piece 4E can be shifted from the conductive state to the cut-off state without using the thermally actuated element 5 which generates a large stress at the time of inversely-warping deformation.

While detailed description has been made of the current cut-off device 1 and so forth of the present invention, the present invention can be embodied in various forms without being limited to the illustrated embodiments. That is, the current cut-off device 1 and so forth are only required to be configured so as to have at least: the plate-shaped terminal piece 2 having the contact 21; the movable piece 4 which has the elastic portion 44 formed in a plate shape to be elastically deformed and the movable contact 41 at one end portion of the elastic portion 44 and presses the movable contact 41 so as to be in contact with the contact; and the thermally actuated element 5 which biases the movable piece 4 by deforming in accordance with a temperature change and causes the state of the movable piece 4 to be shifted from the conductive state in which the movable contact 41 is in contact with the contact 21 to the cut-off state in which the movable contact 41 is separated from the contact 21, and to be configured such that when the state of the movable piece 4 is shifted from the conductive state to the cut-off state, as the movable contact 41 moves, it gets over the contact 21.

For example, the technique of joining the case main body 7 with the lid member 8 and the bottom member 9 is not limited to ultrasonic welding, and any technique can be applied as appropriate as long as both members are firmly joined together and can achieve sufficient hermeticity. For example, both may be adhered together by coating and filling with a liquid or gel adhesive and curing.

Further, the current cut-off device may have a configuration in which the movable piece 4 and the thermally actuated element 5 are integrally formed by forming the movable piece 4 of laminated metals such as a bimetal, tri-metal, or the like. In this case, the configuration of the current cut-off device 1 and so forth is simplified.

Figure 12:
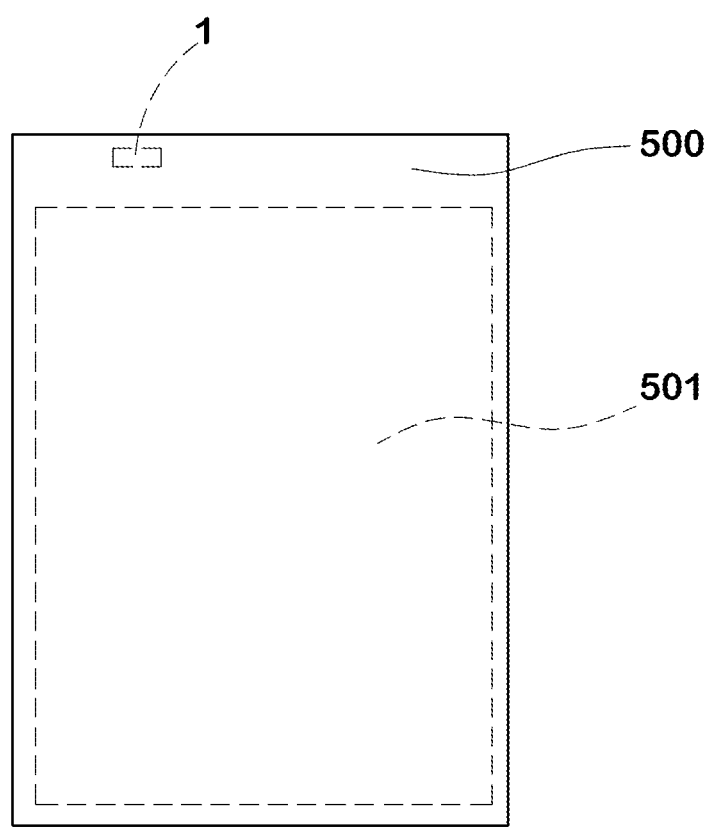
FIG. 12 is a plan view showing the configuration of a secondary battery pack provided with the above current cut-off device of the present invention.
Figure 13:
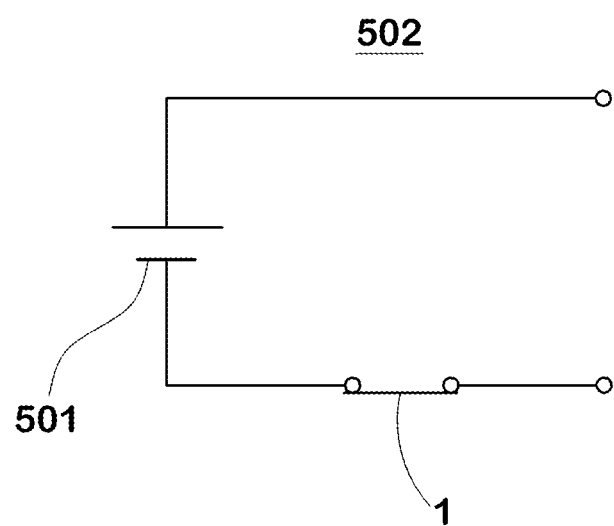
FIG. 13 is a circuitry diagram of a safety circuit provided with the above current cut-off device of the present invention.

Furthermore, the current cut-off device 1 and so forth of the present invention can be widely applied to a secondary battery pack, a safety circuit for electrical equipment, and so forth. FIG. 12 shows a secondary battery pack 500. The secondary battery pack 500 includes a secondary battery 501 and the current cut-off device 1 or the like provided in an output end circuit of the secondary battery 501. FIG. 13 shows a safety circuit 502 for electrical equipment. The safety circuit 502 includes the current cut-off device 1 or the like provided in series in an output circuit of the secondary battery 501. Part of the safety circuit 502 may be configured of a cable including a connector which includes the current cut-off device 1 or the like.

DESCRIPTION OF THE REFERENCE NUMERALS 1 current cut-off device
2 terminal piece
4 movable piece
5 thermally actuated element
7 case main body (first case)
8 lid member (second case)
10 case
11 movable body
21 contact
26 first surface
27 second surface
41 movable contact
44 elastic portion
73 hole portion
81 through hole

The invention claimed is:
1. A current cut-off device comprising:
a plate-shaped terminal piece having a contact;
a movable piece including an elastic portion formed in a plate shape so as to be elastically deformed and a movable contact arranged at one end portion of the elastic portion and having the movable contact so as to be pressed against and in contact with the contact; and
a thermally actuated element which biases the movable piece by deforming in accordance with a temperature change and causes a state of the movable piece to be shifted from a conductive state in which the movable contact is in contact with the contact to a cut-off state in which the movable contact is separated from the contact, wherein
an end portion of the movable contact and an end portion of the contact overlap,
when the state of the movable piece is shifted from the conductive state to the cut-off state, as the movable contact moves, it snaps and moves above the contact so that positional relationship between the end portions of the movable contact and the contact switches, and
a direction in which the movable piece presses the movable contact to the contact and a direction in which the thermally actuated element biases the movable piece match.
2. The current cut-off device according to claim 1, wherein when the state of the movable piece is shifted from the conductive state to the cut-off state, the movable contact moves from a first surface side to a second surface side opposite to the first surface of the terminal piece.

3. The current cut-off device according to claim 1, wherein the thermally actuated element biases the movable piece in a direction of pushing when the state of the movable piece is shifted from the conductive state to the cut-off state.

4. The current cut-off device according to claim 1, wherein
the device comprises a case for accommodating the contact, the elastic portion, the movable contact, and the thermally actuated element, and
the terminal piece and the movable piece are embedded in the case.

5. The current cut-off device according to claim 4, wherein
the case includes a first case provided with a hole portion for accommodating the contact, the elastic portion, the movable contact, and the thermally actuated element, and
a second case configured to be attached to the first case so as to close the hole portion.

6. The current cut-off device according to claim 4, wherein
the device has a movable body movably provided with respect to the case, and
the movable body is pressed onto the movable piece in the cut-off state so as to get the state of the movable piece back to the conductive state.

7. The current cut-off device according to claim 5, wherein
the device has a movable body movably provided with respect to the case,
the movable body is pressed onto the movable piece in the cut-off state so as to get the state of the movable piece back to the conductive state,
the second case has formed therein a through hole for allowing part of the movable body to stick out of the case, and
the movable body is provided so as to freely protrude and retract from the through hole.

8. The current cut-off device according to claim 1, wherein
a slit extending in a longitudinal direction of the movable piece is formed in at least one of the contact and the movable contact.

9. A safety circuit for electrical equipment comprising the current cut-off device according to claim 1.

10. A secondary battery pack comprising the current cut-off device according to claim 1.

* * * * *